United States Patent Office 3,558,774
Patented Jan. 26, 1971

3,558,774
METHOD OF TREATING HEPATIC ENCEPHALOPATHY
Leo H. F. Demeulenaere, Tielt, Belgium, assignor to U.S. Philips Corporation, New York, N.Y., a corporation of Delaware
No Drawing. Filed Apr. 1, 1969, Ser. No. 812,293
Int. Cl. A61k 27/00
U.S. Cl. 424—180
4 Claims

ABSTRACT OF THE DISCLOSURE

Reduction of the symptoms of hepatic encephalopathy by the rectal administration of lactulose This invention relates to a method for the reduction of symptoms caused by hepatic encephalopathy.

Portal-system encephalopathy or hepatic encephalopathy is an incapacitating disease manifested by various neuropsychiatric symptoms such as confusion, coma, flapping tremor and asterixis.

In order to reduce these symptoms, one known method is to severely restrict the dietary proteins. However, this method has not proved successful as it results in the exaggeration of an already existing negative protein balance. Another known method is the long term administration of neomycin in order to reduce the bacterial flora in the large intestine. However, this method is complicated by the appearance of diarrhea, steatorrhea, moniliasis and staphylococcal entrocolitis.

According to another method symptoms of hepatic encephalopathy are reduced or eliminated by oral and daily administration of lactulose.

Although the latter method gives satisfactory results, in arriving at the present invention it has been found that these results may be further improved. Notably it has been found that a rapid improvement in the clinical condition of comatose patients is obtainable by employing the method of treatment in accordance with the invention. Treated patients recovered consciousness within one to two hours after the beginning of the treatment and the ammonia content of their blood serum was reduced by about one third within two hours. Furthermore, a manifest improvement was found on the electroencephalogram (EEG).

According to the invention, symptoms of hepatic encephalopathy in mammals, especially in human beings, are reduced by the rectal administration of an aqueous lactulose-containing liquid to mammals who show symptoms of hepatic encephalopathy. As a rule, the treatment in accordance with the invention need only be carried out once. Subsequently the patient can be kept in a satisfactory condition by oral administration of lactulose. If desired, however, the rectal administration may be repeated at longer or shorter intervals.

The result of the invention may be achieved by widely different amounts of lactulose and widely different concentrations thereof in the aqueous liquid. The optimal dose is also highly dependent upon the condition of the patient. Generally satisfactory results were achieved by the administration of from 0.2 to 2 litres of aqueous liquid containing from 25 to 250 gm. of lactulose. In a practical treatment 750 to 1,500 ml. of an aqueous solution containing from 10 to 30% by weight of lactulose were used. The lactulose may be mixed with other compounds, for example saccharoid such as those produced in the preparation of lactulose from lactose, for example glucose or galactose. In carrying the invention into practice, these results were obtained by means of a commercially available lactulose preparation in the form of an aqueous syrup containing per 100 g. of liquid 53 gm. of lactulose, 5 gm. of lactose, 10 gm. of galactose and 2% other carbohydrates. In carrying out the method in accordance with the invention the lactulose-containing aqueous liquid preferably diluted with water is cautiously injected rectally into the large intestine for example by means of a syringe. The volume may be from 200 ml. to 2 litres. Very good results were obtained by the administration of 300 ml. of the said syrup diluted with water to 1 liter of liquid. After the administration the rectal orifice must be closed, for example by means of a bulb, to prevent the lactulose-containing liquid from escaping. The time of retention of the liquid in the body is not restricted within narrow limits, but for practical considerations it must not be longer than two hours and not shorter than 5 minutes. The repeated administration of a lactulose enema of 500 ml. of a 15% solution of lactulose for a comparatively short period of from 10 to 25 minutes even has certain advantages over a single enema of twice this amount for one hour. The short-time retention of the liquid in the large intestine ensures that substances which contribute to the comatose condition of the patient are removed from the body comparatively rapidly.

The invention will now be described in greater detail with reference to the following example.

EXAMPLE

A patient who suffered from hepatic encephalopathy owing to a Laennec's cirrhosis and was in a state of total unconsciousness was treated rectally with a dose of 1,000 ml. of a lactulose-containing aqueous solution. The solution had the following composition:

700 ml. of water and 300 ml. of an aqueous syrup of commercial quality lactulose (trademark "Duphalac") which contains per 100 g. of liquid 53 gm. of lactulose, 5 gm. of lactose and 10 gm. of galactose and for the remainder other carbohydrates. The rectal orifice was closed by means of a bulb. After 20 minutes the closure was removed and the liquid was allowed to flow away. Within one hour from the beginning of the treatment the comatose condition improved considerably in that the state of total unconsciousness changed to that of normal consciousness, still associated, however, with loss of memory and disorientation. This condition improved in the next 24 hours. Also the content of $NH_4$-ions in 100 ml. of serum falls from 289 micrograms in the comatose state to 180 micrograms 2 hours from the beginning of the treatment. Furthermore, the EEG already improved within one hour from the beginning of the treatment and this improvement subsequently continued in the next hours.

What I claim is:

1. A method of combatting the symptoms of hepatic encephalopathy in mammals, particularly in human beings, comprising rectally administering to a mammal suffering from hepatic encephalopathy an aqueous solution of lactulose in an effective concentration, retaining the solution in the body of the mammal for a period of 5 minutes to 2 hours and then allowing the solution to be discharged from the body of the mammal.

2. The method of claim 1 wherein an amount of from 200 to 2,000 ml. of an aqueous solution containing from 25 to 250 grams of lactulose is administered.

3. The method of claim 2 wherein an amount of from 756 to 1,500 ml. of an aqueous solution containing 10 to 30% by weight is administered.

4. The method of claim 1 wherein the aqueous solution is kept in the body for a period of from 10 to 25 minutes.

References Cited
UNITED STATES PATENTS 3,272,705  9/1966  Petuely et al. _____ 424—180

STANLEY J. FRIEDMAN, Primary Examiner